United States Patent [19]

Mackey

[11] Patent Number: 5,406,419

[45] Date of Patent: Apr. 11, 1995

[54] AIRMOTOR POWERED REMOTE ADJUSTABLE MIRROR

[75] Inventor: Gary T. Mackey, Arlington, Tex.

[73] Assignee: Moto Mirror, Inc., Arlington, Tex.

[21] Appl. No.: 132,757

[22] Filed: Oct. 6, 1993

[51] Int. Cl.6 .............................................. G02B 7/182
[52] U.S. Cl. .................................... 359/878; 359/876; 359/508
[58] Field of Search ............... 359/508, 871, 872, 876, 359/877, 878, 525

[56] References Cited

U.S. PATENT DOCUMENTS

| | | |
|---|---|---|
| 3,005,384 | 10/1961 | Baird et al. . |
| 3,610,736 | 10/1971 | Bateman . |
| 3,624,818 | 11/1971 | Stanfield . |
| 3,650,607 | 3/1972 | Rogers et al. .................. 359/878 |
| 3,687,525 | 8/1972 | Riccio ............................. 359/878 |
| 3,815,365 | 6/1974 | House . |
| 3,825,324 | 7/1974 | Brewington .................... 359/878 |
| 3,873,190 | 3/1975 | Hess . |
| 4,245,893 | 1/1981 | Lafont et al. . |
| 4,281,899 | 8/1981 | Oskam . |
| 4,286,841 | 9/1981 | Deshaw . |
| 4,295,708 | 10/1981 | Albrecht et al. . |
| 4,341,444 | 7/1982 | Stelma . |
| 4,364,638 | 12/1982 | Pierce, III . |
| 4,456,333 | 6/1984 | Hewitt . |
| 4,464,016 | 8/1984 | Weber et al. . |
| 4,519,677 | 5/1985 | Weber et al. . |
| 4,701,037 | 10/1987 | Bramer . |
| 4,732,463 | 3/1988 | Mittelhauser . |
| 4,768,871 | 9/1988 | Mittelhauser et al. . |
| 4,784,011 | 11/1988 | Riley . |
| 4,856,886 | 8/1989 | Polzer et al. . |
| 4,863,255 | 9/1989 | Seitz . |
| 4,918,920 | 4/1990 | Duroux . |
| 4,991,950 | 2/1991 | Lang et al. . |
| 5,020,896 | 6/1991 | Vercesi et al. . |
| 5,035,496 | 7/1991 | An . |
| 5,059,014 | 10/1991 | Mittelhauser et al. . |

Primary Examiner—Loha Ben
Assistant Examiner—Thomas Robbins
Attorney, Agent, or Firm—Robert A. Felsman

[57] ABSTRACT

An air powered motor 10, mounted inside an outer cover 11 to effect the movement of a mirror 12 in one or more axis 35. The pneumatic motor is coaxial with a threaded and pivoted rod 13 and contains a rotor or ring gear 14 with vanes 15 arrayed around the exterior of the gear. Pressurized air is introduced into the motor, against the vanes 15, causing a center piece or gear 16 to rotate about the operating rod 13 attached to a mirror mounting plate 17. As a result, the mirror rotates on its hinge 18. The direction of air flow from the fluid source can be reversed with a control valve, causing the mirror to rotate in the opposite direction. The mirror's rotation about its axis is controlled from a remote location, such as the cab of a large truck, by moving the air control valve.

20 Claims, 4 Drawing Sheets

AIRMOTOR POWERED REMOTE ADJUSTABLE MIRROR

BACKGROUND OF THE INVENTION

1. Field of the Invention

The present invention relates to mirrors and more particularly to rear or side view mirrors for transportation vehicles, such as automobiles, boats, trains, aircraft, and especially trucks and buses.

2. Background Information

The necessity for rear view mirrors on vehicles such as trucks, municipal buses, school buses, and recreational vehicles has long been apparent. Drivers must see from the normal driver's position the reflections of objects such as other vehicles, the roadbed and obstructions outside the restricted limits of direct vision. On large vehicles, the mirrors are normally positioned on the exterior of the body, as the view directly behind the driver is usually blocked by either interior components of the vehicle or exterior components such as a trailer. It is advantageous for vehicle mirrors to be adjustable to accommodate the changing need of drivers to view different areas around the vehicle, to accommodate different drivers, and in the case of articulated vehicles to keep the rear of the vehicle in view during turning maneuvers.

The mirrors most suitable for this purpose must possess a number of attributes. They must provide a usable image even when subjected to the vibration and shock concomitant with usage on heavy vehicles. They must maintain their position when subjected to the forces of the wind, vibration and shock for long periods of time. They should be mechanically durable and resist the effects of the environment such as road salt, vehicle wash acid, water, ice, and extreme of temperature variations. Another type of durability that is advantageous is the ability of the adjustment system to resist damage when operated against a load, i.e. not suffer damage if operation is attempted when the mechanism is frozen with ice or if the mechanism is operated accidentally against the limits of travel for an extended period of time, such as an object inadvertently falling against the switch in the cab of a truck. It is most convenient for the mirrors to be remotely adjustable from the drivers normal position behind the steering wheel. It is also a great advantage if the mirror can be manually adjusted should there be a failure of the remote adjusting system. This is both for safety reasons and because the current law in many states requires that the mirrors on heavy vehicles be serviceable if the vehicle is to be operated on the highways of a state or other governmental entity.

Perhaps the simplest and oldest method of remotely adjusting rear view mirrors on the outside of a vehicle is to provide the operator with a mechanical device, such as a wire cable inside a tightly wound steel spring that is connected to an appropriate point on the plate the mirror is mounted upon. Variations on this theme have been patented as recently as 1988 and 1989 (Riley, U.S. Pat. No. 4,784,011; Polzer, U.S. Pat. No. 4,856,886; and Seitz, U.S. Pat. No. 4,863,255). While economical, these types of systems do not permit the ease of precision adjustments demanded by discerning users and tend to be subject to vibrations to the point of being unusable on heavy vehicles. These shortcomings have resulted in a number of more sophisticated (and more expensive) designs.

The most common type of drive system for remote controlled mirrors uses one or more electric motors. The number of U.S. Patents using this power source is a testament to the popularity of electric motors. These patents include Baird, U.S. Pat. No. 3,005,384; Bateman, U.S. Pat. No. 3,610,736; Lafont et. al., U.S. Pat. No. 4,245,893; Oskam, U.S. Pat. No. 4,281,899; Deshaw, U.S. Pat. No. 4,286,841; Albrecht et. al., U.S. Pat. No. 4,295,708; Stelma, U.S. Pat. No. 4,341,444; Hewitt, U.S. Pat. No. 4,456,333; Weber, U.S. Pat. No. 4,464,016; Weber et. al.,U.S. Pat. No. 4,519,677; Bramer, U.S. Pat. No. 4,701,037; Lang et. al., U.S. Pat. No. 4,991,950; Vercesi et. al., U.S. Pat. No. 5,020,896; and Mittelhauser, U.S. Pat. No. 5,059,014. Irrespective of their popularity, electric motors have many problems. These include greater weight and cost, the necessity of a heavy and complex gear reduction system, greater space requirements, the propensity of electric motors to burn out when subjected to high loads for extended periods of time, and the susceptibility of electrical systems to vehicle wash acid and road salt.

The problems with electric motors have inspired a number of other inventors to attempt improvements upon the electric systems by using hydraulic or pneumatic cylinders. Designs using these power sources are detailed in U.S. Patents by Stanfield, U.S. Pat. No. 3,624,818; Rogers, U.S. Pat. No. 3,650,607; House, U.S. Pat. No. 3,815,365; Brewington, U.S. Pat. No. 3,825,324; Pierce, U.S. Pat. No. 4,364,638; and An, U.S. Pat. No. 5,035,496. Similar power sources are the bellows or bladder designs described in U.S. Patents Hess, U.S. Pat. No. 3,873,190; Mittelhauser, U.S. Pat. No. 4,732,463 and U.S. Pat. No. 4,768,871; and Duroux, U.S. Pat. No. 4,918,920. While offering some advantages, such as the ability to be operated against a stalling load for long periods of time, these pneumatic or hydraulic systems are susceptible to leakage, and must maintain a constant pressure in order to maintain position and to prevent the mirror from inadvertently changing position.

In an attempt to solve all of the above problems, Victor Riccio developed a design using an externally mounted blower wheel and gear train, disclosed in U.S. Pat. No. 3,687,525. The gear train rotates a vertical shaft attached to the mirror. Due to its bulky shape, the power train is external and exposed to the elements. The line of power transmission makes a 90 degree turn, and has three gear interfaces between the vertical mirror shaft and the worm gear. In a gear train such as this, regardless of application, the worm gear is the entity that prevents movement of the mechanism when force is applied from the reverse direction. In the design of externally mounted rear view mirrors it is of critical importance that the extreme vibration encountered, due to the engine and the movement of the vehicle over uneven road surfaces, has minimal transmission to the rear view mirrors. It is apparent that the aforementioned three gear interfaces would allow considerable movement before being stopped by the worm gear, and it can inferred that a mirror so designed would have grossly unacceptable vibration and movement characteristics (position creep) when in operation on heavy vehicles. Still another problem with this design is that a system that rotates a vertical center shaft is not appropriate for a mirror that rotates in more than one axis.

SUMMARY OF THE INVENTION

It is an object of this invention to provide an improved, externally mounted side or rear view mirror for the aforementioned large vehicles that is economical to produce, light in weight, of minimal dimensions, and durable when used in a rigorous environment of vibration, shock, extreme temperatures, and corrosive chemicals.

It is also an object of this invention to produce such mirrors that provide a relatively stable image even when subjected to the vibrations and shocks normally encountered in usage on large trucks.

Still another object of the invention is to provide a mirror system that maintains its position, and therefore maintains the operators desired viewing area, even when subjected to the aforementioned vibrations and shocks over extended periods of operation.

Still another object of the invention is to provide a remotely controlled device that can be used to rotate the mirror in either one axis, or can be adapted to rotate the mirror in the operators choice of two axis, or to rotate the mirror in two axis simultaneously.

Still another object of the invention is to provide a mirror system that can be manually adjusted, without damage to any part of the system, by applying force to the mirror itself.

Still another object of the invention is to provide a mirror that has an infinite number of adjustment points between the limits of extreme travel.

Still another object of the invention is to provide a mirror system that is resistant to damage in that the operating mechanism can be powered, for an unlimited time, against a load sufficient to stall the operating mechanism.

Still another object of the invention is to provide a remotely controlled adjustable mirror system that is tolerant of leaks in the system.

The objects of the present invention are achieved generally with an air powered motor 10, illustrated in detail in FIG. 2, mounted inside an outer cover 11, to effect the movement of the mirror 12 in one or more axis. The pneumatic motor 10 is coaxial with a threaded operating rod 13 and contains a rotor 14 with vanes 15 arrayed around the periphery. When pressurized air is introduced into the motor 10, the vanes 15 turn and cause a center piece 16 to rotate about the operating rod 13 attached to a mirror mounting plate 17, resulting in the rotation of the mirror on its hinge 18. The operating rod 13 is provided with a pin 19 or other device to limit the travel of the center piece 16. The direction of air flow can be reversed, causing the mirror 12 to rotate in the opposite direction. The mirror's rotation about its axis is controlled from a remote location, such as the cab of a large truck, by moving an air valve.

The above as well as additional objects, features, and advantages of the invention will become apparent in the following detailed description.

DETAILED DESCRIPTION OF THE INVENTION

Figure 1:
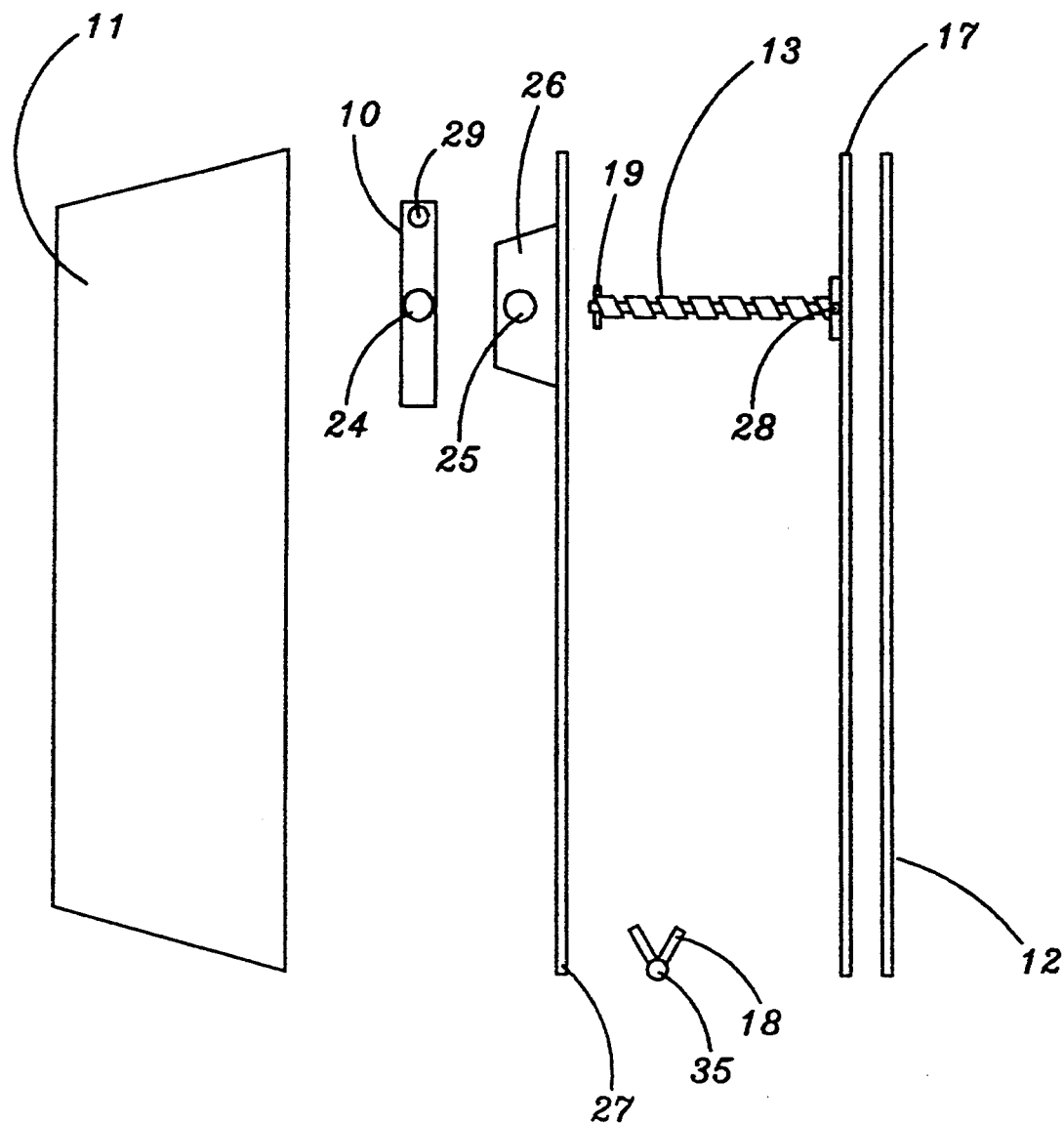
FIG. 1 is an exploded side elevational view of a remote controlled mirror that embodies the principles of the invention.
Figure 2:
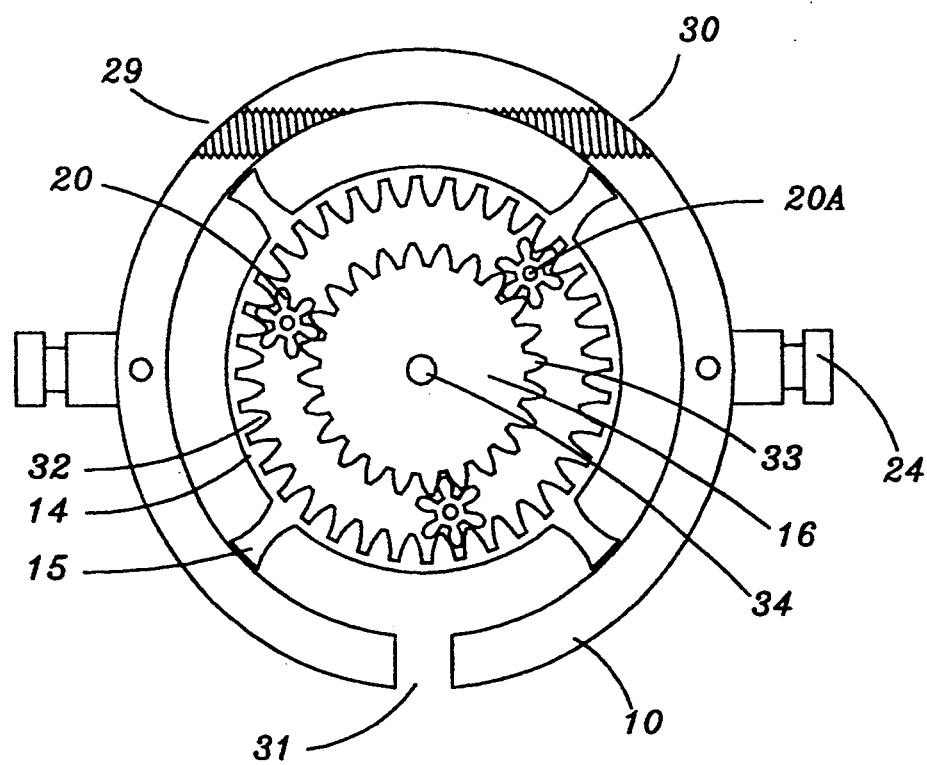
FIG. 2 is a plan view of the pneumatic motor shown in FIG. 1, with the top plate removed to expose the interior structure.
Figure 2A:
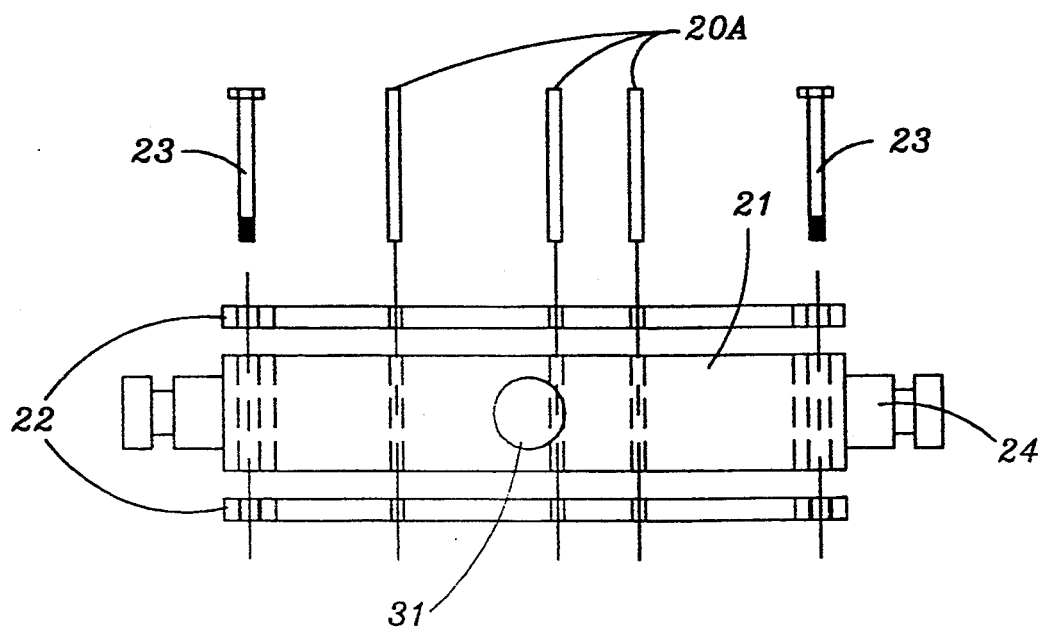
FIG. 2A is a side elevational view of the pneumatic motor body of FIG. 2, with the upper and lower cover plates in position for attachment to the body.

The preferred embodiment of the present invention is illustrated in FIGS. 1 and 2. Here, an otherwise conventional air motor 10 is provided with speed reduction and increased output torque by pinion gears 20 (see FIG. 2) between the outer ring gear 14 and a center piece or central gear 16. The pinion gears 20 turn on pins 20A. The gears are contained in a motor housing 21 and two cover plates 22 secured by bolts 23, illustrated in FIG. 2A. The air motor 10 is pivoted at two points on spindles 24 adapted to be rotationally coupled to aperture 25 (see FIG. 1) of brackets 26 of a support plate 27 to allow the motor to adjust to the changing aspect angle of a threaded shaft 13. The shaft 13 is pivoted at a connection point 28 to a mirror mounting plate 17. Air from a pressurized source (not shown) is caused to enter at either point 29 or 30 (see FIG. 2) by a control valve (not shown) accessible to the driver of the associated vehicle, depending on the direction of rotation desired. In either instance, the air will exhaust at point 31, after impinging upon the vanes 15 on the exterior annular surface of the rotor 14. Interior teeth 32 of the ring gear 14 engage the teeth of the pinion gears 20. The teeth of the pinion gears 20 engage the teeth 33 of the central gear 16, having a central threaded hole 34 into which one end of the threaded shaft 13 is attached. Alternately, a threaded nut can be pressed or molded into the central piece to form the threaded hole 34. This type of motor is extremely compact and lightweight, and can be enclosed by an aerodynamic shell or cover 11. The above components are produced by low cost mass production methods, such as injection molding or die casting. In this illustration, the air motor causes the mirror to rotate in a vertical plane defined by the horizontal axis 35.

By changing the position of the axis 35 of the hinge 18 and the attachment point 28 of the threaded shaft 13, the air motor can be made to rotate the mirror 12 in a horizontal direction. Alternatively, two motors can be combined with suitable mirror mounting plates and hinges to make rotation in two axis possible. The unique combination of internal gears in the air motor 10 and the threaded shaft 13, which is also a type of gear reduction device, combine to give the air motor ample torque to move the mirror against resistance. If the central threaded hole 34 is designed to have a sufficiently tight fit on the threaded shaft 13, the assembly is extremely resistant to movement of the mirror caused by vibration or shock. In the preferred embodiment, the center piece or gear 16 is constructed of a polymeric substance such as Nylon or Delrin (Products and Trademarks of E.I. DuPont deNemours, Inc.)which have been found to be particularly suitable for this application. Zero clearance is used between the nut and threaded shaft to minimize movement due to vibration. In this "nut on a threaded shaft"arrangement, the nut, or part 16, cannot be rotated by applying axial thrust to the shaft 13. Since movement induced by reverse force (vibration or shock to the mirror 12) is stopped at the interface of part 13 and part 16, the tolerance in all gear teeth interfaces, necessary in any conventional gear train, is not translated to the mirror. This results in a significant reduction of unwanted movement of the mirror.

Figure 3:
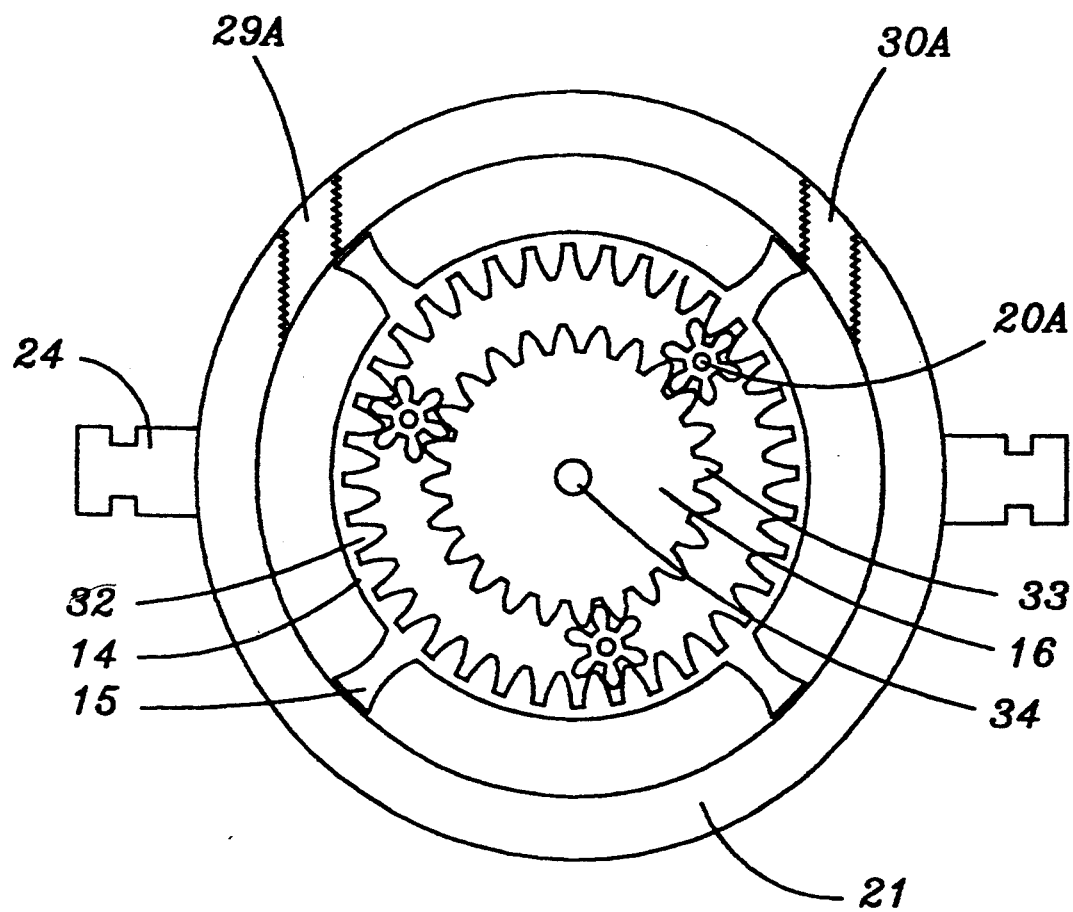
FIG. 3 is an alternate embodiment of the invention with pneumatic ports positioned differently from those of FIGS. 1 and 2.

Another alternate embodiment is illustrated in FIG. 3, in which the air motor is provided with two air ports, 29A and 30A. The air motor is controlled by a five port, four way valve such that when pressurized air is introduced at point 29A, it is exhausted at point 30A, and when pressurized air is introduced at point 30A it is exhausted at point 29A.

Figure 4:
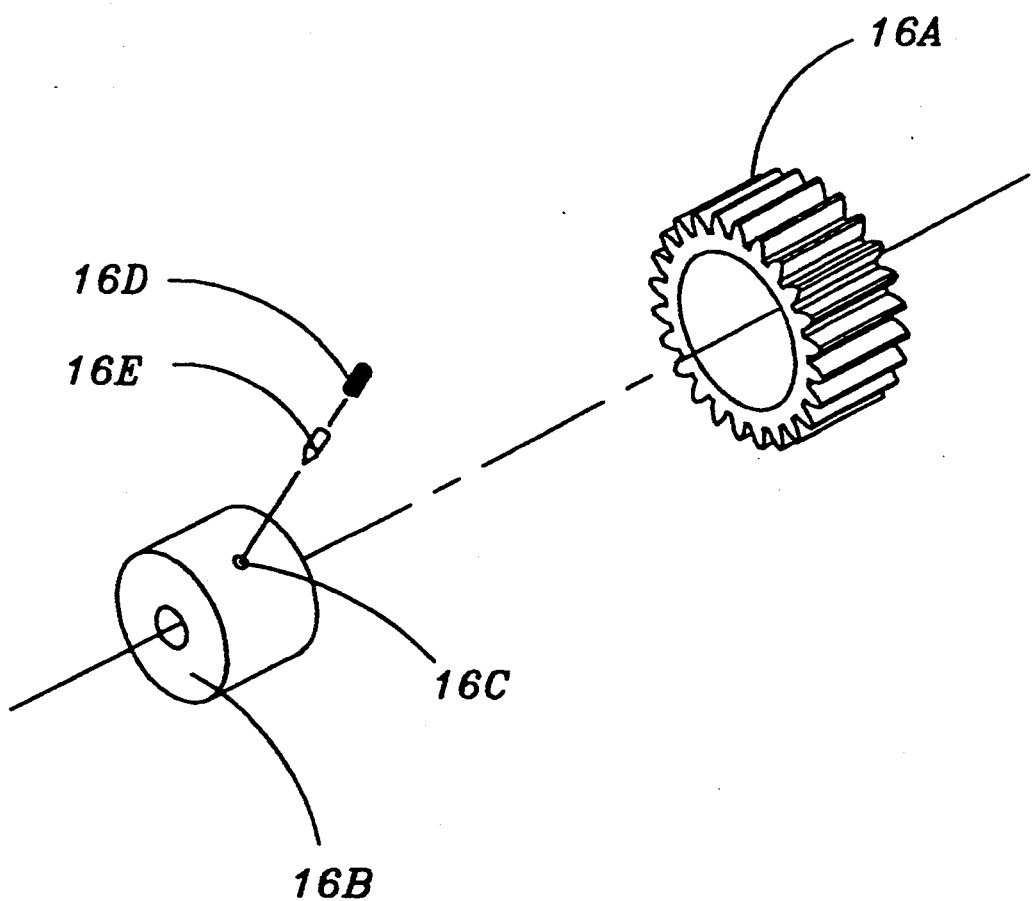
FIG. 4 illustrates an alternate embodiment in which the central gear is to permit intentionally induced slippage.

Another alternate embodiment of the present invention uses the same operating system as just described but with the center piece or gear consisting of multiple parts, as illustrated in FIG. 4, that allow the hub to slip on the operating rod when subjected to sufficient force. In this example, the center piece or gear consists of an outer part 16A and an inner part 16B. The inner part 16B is provided with two or more holes 16C. Springs 16D and plungers 16E are inserted into the holes 16C and are retained by the outer part 16A when the inner part 16B is assembled with it and bear on the threaded operating rod 13 with such tension that they track in the grooves of the operating rod during normal operation of the mirror, but can be forced out of the grooves when subjected to a force sufficient to overcome the force of the springs 16D. This example of a preferred embodiment allows the operator to manually adjust the mirror in the event the remote operating system should become disabled. It is also possible to construct the center of one homogeneous piece and provide the desired slip on the operating rod 13 by providing a degree of flex in the internal threads.

A mirror so designed is relatively immune to substantial leaks in the system. Such leaks do not cause a change in the position of the mirror. The motors can be operated for an unlimited time, without damage, against a load sufficient to stall them.

While the invention has been shown in only a few of its forms, it should be apparent to those skilled in the art that it is not thus limited, but is susceptible to various changes and modifications without departing from the spirit thereof.

What is claimed is:

1. A remotely adjustable mirror for use on a vehicle comprising:
   a housing;
   a mirror on a mount having a hinged connection with the housing;
   a threaded shaft with one end rotatably connected with the mount;
   a gear reducer with a threaded opening coaxially attached to the threaded shaft and supported in the body of a pneumatic motor;
   intake and exhaust ports to introduce pressurized air into the body of the motor to rotate the gear reducer and move the mirror about the hinge.

2. The invention of claim 1 in which the gear reducer comprises:
   a central gear with exterior teeth, including a threaded opening, the central gear being attached to the threaded shaft and supported in the body of the pneumatic motor;
   a ring gear with exterior vanes and interior teeth, the ring gear being rotatable in the body of the motor;
   plural pinion gears carried between the interior teeth of the ring gear and the teeth of the central gear.

3. The invention defined by claim 2 wherein the central gear includes an inner part and at least one resiliently mounted plunger inserted into a radial hole to releasably engage the threads of the threaded shaft.

4. The invention of claim 3 wherein the threaded shaft is pivotally connected to the mirror mount.

5. The invention of claim 4 wherein the motor is enclosed in an aerodynamic shell.

6. The invention of claim 3 wherein the central gear is constructed of a polymer.

7. The invention of claim 6 wherein the central gear is constructed of a polymer and engages the threads of the threaded shaft with zero clearance to minimize vibration.

8. A remotely adjustable mirror for use on a vehicle comprising:
   a housing;
   a minor on a mount having a hinged connection with the housing;
   a threaded shaft with one end rotatably connected with the mount;
   a rotating member with a threaded opening coaxially attached to the threaded shaft and supported in the body of a pneumatic motor;
   intake and exhaust ports to introduce pressurized air into the body of the motor to rotate the rotating member and move the mirror about the hinge.

9. The invention of claim 8 in which the rotating member comprises:
   a central gear with exterior teeth, including a threaded opening, the central gear being attached to the threaded shaft and supported in the body of the pneumatic motor;
   a ring gear with exterior vanes and interior teeth, the ring gear being rotatable in the body of the motor;
   plural pinion gears carried between the interior teeth of the ring gear and the teeth of the central gear.

10. The invention defined by claim 9 wherein the central gear includes an inner part and at least one resiliently mounted plunger inserted into a radial hole to releasably engage the threads of the threaded shaft.

11. The invention of claim 9 wherein the central gear is constructed of a polymer.

12. The invention of claim 9 wherein the central gear is constructed of a polymer and engages the threads of the threaded shaft with zero clearance to minimize vibration.

13. The invention of claim 8 wherein the threaded shaft is pivotally connected to the mirror mount.

14. The invention of claim 8 wherein the motor is enclosed in an aerodynamic shell.

15. A remotely adjustable mirror for use on a vehicle comprising:
   a housing;
   a mirror on a mount having a hinged connection with the housing;
   a threaded shaft with one end rotatably connected with the mount;
   a gear reducer with a threaded opening coaxially attached to the threaded shaft and supported in the body of a pneumatic motor, the gear reducer including:
      a central gear with exterior teeth, including a threaded opening, the central gear being attached to the threaded shaft and supported in the body of the pneumatic motor;

a ring gear with exterior vanes and interior teeth, the ring gear being rotatable in the body of the motor;

plural pinion gears carried between the interior teeth of the ring gear and the teeth of the central gear;

intake and exhaust ports to introduce pressurized air into the body of the motor to rotate the gear reducer and move the mirror about the hinge.

16. The invention defined by claim 15 wherein the central gear includes an inner part and at least one resiliently mounted plunger inserted into a radial hole to releasably engage the threads of the threaded shaft.

17. The invention of claim 15 wherein the threaded shaft is pivotally connected to the mirror mount.

18. The invention of claim 15 wherein the motor is enclosed in an aerodynamic shell.

19. The invention of claim 15 wherein the central gear is constructed of a polymer.

20. The invention of claim 15 wherein the central gear is constructed of a polymer and engages the threads of the threaded shaft with zero clearance to minimize vibration.

* * * * *